United States Patent [19]

Inoue et al.

[11] Patent Number: 4,865,397
[45] Date of Patent: Sep. 12, 1989

[54] ANTI-LOCK BRAKING SYSTEM FOR A VEHICLE HAVING A TRACTION CONTROL MODULE

[75] Inventors: Yoshiaki Inoue; Yoshihisa Nomura, both of Toyota; Kiyotaka Ise, Susono; Hiromi Otsuki, Anjo, all of Japan

[73] Assignee: Toyota Jidosha Kabushiki Kaisha & Nippondenso Co., Ltd., Aichi, Japan

[21] Appl. No.: 218,887

[22] Filed: Jul. 14, 1988

[30] Foreign Application Priority Data

Jul. 22, 1987 [JP] Japan .................... 62-183038

[51] Int. Cl.⁴ ..................... B60T 8/64; B60T 8/36
[52] U.S. Cl. ..................... 303/110; 303/119; 180/197
[58] Field of Search ............ 303/96, 98, 100, 113, 303/110, 114, 116, 119; 180/197; 364/426.02, 426.03

[56] References Cited

U.S. PATENT DOCUMENTS

| 3,981,545 | 9/1976 | Eddy | 188/181 A |
| 4,206,950 | 6/1980 | Elliott | |
| 4,509,802 | 4/1985 | Selleder et al. | 180/197 X |
| 4,662,687 | 5/1987 | Leiber | 303/114 X |
| 4,681,374 | 7/1987 | Nakamura et al. | 180/197 X |
| 4,715,663 | 12/1987 | Hattori et al. | 303/116 |
| 4,778,225 | 10/1988 | Rudolph et al. | 303/114 |
| 4,807,943 | 2/1989 | Ogino | 180/197 X |

FOREIGN PATENT DOCUMENTS

| 0280740 | 9/1988 | European Pat. Off. | 303/119 |
| 3609974 | 10/1986 | Fed. Rep. of Germany | 303/119 |
| 22948 | 3/1981 | Japan . | |
| 0001583 | 3/1988 | World Int. Prop. O. | 303/119 |

Primary Examiner—Andres Kashnikow
Assistant Examiner—Timothy Newholm
Attorney, Agent, or Firm—Oliff & Berridge

[57] ABSTRACT

A vehicle anti-lock braking system having a master cylinder operated upon operation of a brake operating member, a wheel cylinder activated by a pressure produced by the master cylinder, and an anti-lock control device which includes a slip ratio detector for detecting a slip ratio of a drive wheel of the vehicle, and a pressure regulating device for controlling a pressure in the wheel cylinder, so as to maintain the slip ratio in an optimum range. The system also has a traction control device including a traction control power source, and a communication switching device for selective communication of the pressure regulating device with the traction control power source or the master cylinder. The switching device maintains a discharge port of the pressure regulating device in communication with a reservoir while the traction control power source is in communication with the pressure regulating device, and disconnects the discharge port from the reservoir while the master cylinder is in communication with the pressure regulating device.

10 Claims, 8 Drawing Sheets

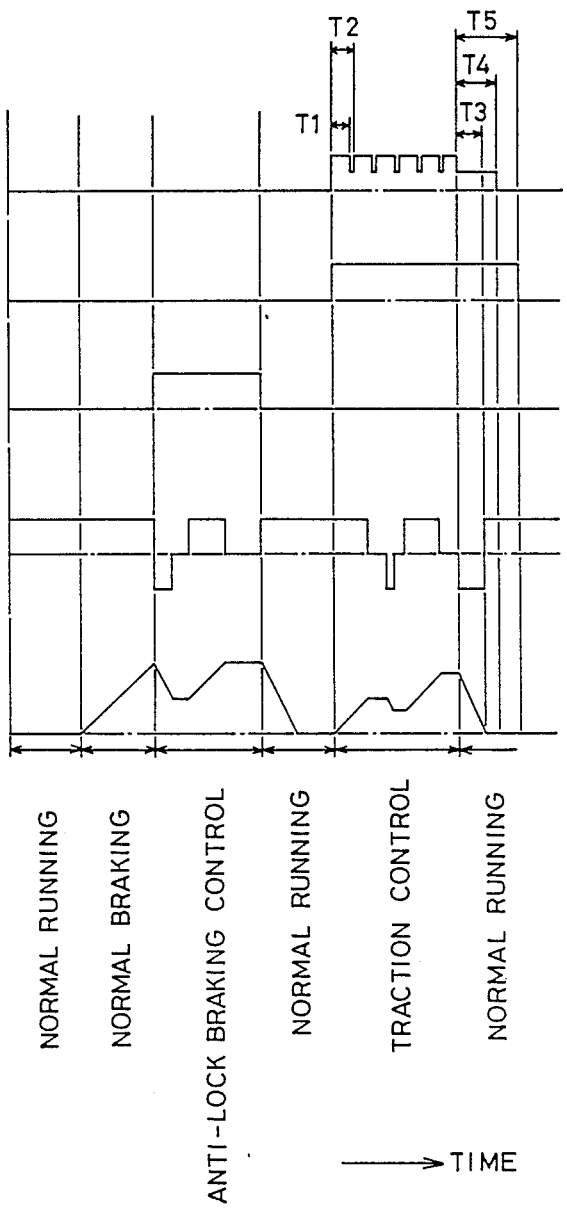

WHEEL CYLINDER PRESSURE

WHEEL CYLINDER PRESSURE

2

ANTI-LOCK BRAKING SYSTEM FOR A VEHICLE HAVING A TRACTION CONTROL MODULE

BACKGROUND OF THE INVENTION

1. Field of the Invention

The present invention relates generally to a hydraulically operated braking system for motor vehicles, and more particularly to improvements in such a braking system of a type which is capable of performing both an anti-lock or anti-skid braking pressure control, and a traction control of drive wheels of the vehicle.

2. Discussion of the Prior Art

The anti-lock braking pressure controlled is effected to prevent the vehicle wheels from skidding on a road surface upon locking of the wheels due to an excessive braking torque applied to the wheels, in relation to the friction coefficient of the road surface. On the other hand, the traction control of the drive wheels is effected to avoid a phenomenon that the vehicle cannot be suitably or effectively accelerated due to slipping of the drive wheels on the road surface, which is caused by an excessive driving torque applied to the drive wheels, in relation to the friction coefficient of the road surface. A hydraulically operated anti-lock braking system having a traction control function is disclosed in laid-open publication No. 57-22948 (published in 1982) of an unexamined Japanese Patent Application.

In the anti-lock braking system disclosed in the above-identified publication, a pilot-operated directional control valve is provided so that a reservoir and a traction control hydraulic power source are selectively brought into communication with a discharge port of a solenoid-operated pressure regulating device. A brake fluid pressure in a master cylinder of the braking system is employed as a pilot pressure applied to the pilot-operated directional control valve. While the fluid pressure in the master cylinder is relatively high, the directional control valve is placed in a position for fluid communication between the discharge port of the pressure regulating device and the reservoir, so that an anti-skid braking pressure control operation may be performed. While there exists no pressure build-up in the master cylinder with the brake pedal placed in the non-operated position, the directional control valve is placed in a position for fluid communication between the discharge port of the pressure regulating device and the traction control hydraulic power source, so that a traction control of the drive wheels may be achieved. During the traction control operation, the brake fluid is discharged from wheel cylinders (which apply brake to the drive wheels) and is returned to the master cylinder through a fluid passage which connects the pressure regulating device and the master cylinder. In the disclosed braking system, a pump of an anti-lock control hydraulic power source and a pump of the traction control hydraulic power source are incorporated in a modular unit, and are driven by a single common drive motor.

In the braking system described above, the anti-lock control device and the traction control device are elaborately assembled into a relatively compact assembly which is capable of performing both an anti-lock braking pressure regulating operation and a traction control operation. Accordingly, the cost of manufacture of the braking system as a whole can be reduced if all types of a given model of a motor vehicle are equipped with the anti-lock control device and the traction control device.

However, there is a requirement that some types of the same model of vehicle are equipped with only the anti-lock control device while the other types are equipped with both the anti-lock control device and the traction control device. For the vehicles equipped with only the anti-lock control device, the above-indicated assembly of the two devices cannot be employed, and a separate arrangement capable of performing only an anti-lock control operation should be prepared. Therefore, the overall cost of manufacture of the braking systems for the same model of vehicle is raised.

SUMMARY OF THE INVENTION

It is therefore an object of the present invention to provide a braking system for a vehicle which is economical to manufacture, capable of performing both an anti-lock braking pressure regulating operation and a traction control operation, and can be readily graded down into an anti-lock braking system which does not have a traction control arrangement, with minimum modification of the anti-lock control arrangement.

The above object may be attained according to the principle of the present invention, which provides an anti-lock braking system with a traction control function for a vehicle, comprising (a) a hydraulically operated brake device including a master cylinder which produces a braking pressure in response to an operation of a brake operating member, and a wheel cylinder activated by the produced braking pressure to apply brake to a drive wheel of the vehicle (b) an anti-lock control means including slip ratio detecting means for detecting a slip ratio of the drive wheel and a pressure regulating device for controlling a fluid pressure in the wheel cylinder, so as to maintain the slip ratio below a predetermined upper limit, and (c) traction control means including a traction control power source and a communicating switch device, the traction control power source having a pump and an accumulator, and the communication switching device being operable for selective fluid communication of the pressure regulating device with the traction control power source or the master cylinder. The communication switching device is adapted to maintain a discharge port of the pressure regulating device in communication with a reservoir while the traction control power source is held in communication with the pressure regulating device, and to disconnect the discharge port from the reservoir while the master cylinder is held in communication with the pressure regulating device.

According to the principle of the present invention described above, the traction control power source having the pump and accumulator is provided separately from the anti-lock means. The traction control power source is adapted for connection with the anti-lock braking system having the anti-lock control means, through the communication switching device. If it is required that the braking system has only the anti-lock braking pressure control function, the traction control power source and the communication switching device are not connected to the system. On the other hand, if both the anti-lock braking pressure control function and the traction control function are required, the traction control power source and the communication switching device are connected to the system. Thus, the basic anti-lock braking system can be readily modified into the anti-lock braking system not equipped with the traction control means.

Further, the anti-lock control power source and the traction control power source can be designed so as to best suit the individual required functions. Not only the cost of manufacture of the anti-lock braking system without the traction control function can be reduced, but also the cost of the braking system equipped with both the anti-lock control means and the traction control means can reduced to a comparatively low level. Therefore, the average cost of manufacture of the braking systems for different types of vehicle of the same model can be made relatively low.

In one form of the anti-lock braking system of the invention, the anti-lock control means includes an anti-lock control actuator constructed as a first module which incorporates at least an anti-lock control hydraulic pressure source and the pressure regulating device, and the traction control device includes a traction control actuator constructed as a second module separate from the first module, the second module incorporating at least the traction control power source and the communication switching device. Since the anti-lock control actuator and the traction control actuator are provided in the form of the two separate modules, the braking system can be readily graded down into an anti-lock braking system without the traction control arrangement, by simply removing the second module apart from the first module.

In one arrangement of the above form of the invention, the anti-lock control means further includes an anti-lock control unit for controlling the anti-lock control actuator, and the traction control device further includes a traction control unit for controlling the traction control actuator. In this case, the anti-lock control unit and the traction control unit are constituted principally by respective separate computers.

In another form of the present invention, the anti-lock braking system further comprises fluid return control means operable upon termination of a traction control operation by the traction control means, for bringing the wheel cylinder into communication with the reservoir through the pressure regulating device to thereby lower the fluid pressure in the wheel cylinder, and subsequently placing the communication switching device in a position in which the master cylinder communicates with the pressure regulating device. According to this feature of the invention, the brake fluid from the wheel cylinder need not be passed through the master cylinder when it is returned to the reservoir. Further, the instant feature eliminates noises and vibrations which would otherwise occur due to sudden application of the wheel cylinder pressure to the master cylinder when the communication switching device is switched to the position for communication of the master cylinder with the pressure regulating device.

In a further form of the invention, the braking system further comprises pressure release means operable upon termination of a traction control operation by the traction control means, for releasing a fluid pressure in a passage between the pressure regulating device and the communication switching device, into the wheel cylinder through the pressure regulating device, and subsequently restoring the communication switching device to a position in which the master cylinder communicates with the pressure regulating device. This feature of the invention prevents noises and vibrations which would otherwise occur due to application of the relatively high fluid pressure in the passage between the pressure regulating and communication switching devices, to the master cylinder at the end of the traction control operation.

It is desirable that the pressure release means be provided together with the fluid return means, for complete elimination of noises and vibrations of the braking system upon termination of the traction control operation.

In a still further feature of the anti-lock braking system of the invention, the communication switching device includes a solenoid-operated power-source selecting device for the selective fluid communication of the pressure regulating device with the traction control power source or the master cylinder, and further includes a solenoid-operated shut-off valve for fluid communication between the discharge portion of the pressure regulating device and the reservoir.

In one arrangement of the above form of the invention, the solenoid-operated power source selecting device has a normal position in which the master cylinder communicates with the pressure regulating device, a traction control position in which the traction control power source communicates with the pressure regulating device, and a shut-off position in which the master cylinder and the traction control power source are both disconnected from the pressure regulating device, and the braking system further comprises diagnostic control means operable during a traction control operation by the traction control means. The diagnostic control means is adapted to place the solenoid-operated power-source selecting device alternately in the traction control position and the shut-off position for respective predetermined time durations. If a computer used for controlling the traction control means becomes defective for some reason or other, the solenoid-operated power source selecting device of the communication switching device may be held in the traction control position even when the situation does not require a traction control operation. In this case, the vehicle operator unexpectedly experiences brake application to the vehicle. To avoid this trouble, it is desirable to let the vehicle operator know such a defect or malfunction of the traction control computer or related control means, so that the operator may take a necessary procedure. The instant form of the braking system described above makes it possible to detect such an abnormal situation, since the normal traction control operation involves alternate switching of the power-source selecting device between the traction control position and the shut-off position, as distinguished from the constant placement of the power-source selecting device in the traction control position, which may occur due to failure or defective condition of the traction control computer. Thus, the instant form of the braking system has a self-diagnostic function associated with the traction control operation. This function utilizes the third position of the power-source selecting device, i.e., the shut-off position in which the master cylinder and the traction control power source are both disconnected from the pressure regulating device.

In one arrangement of the above form of the invention, the solenoid-operated power-source selecting device consists of a single three-position directional control valve which has the normal position, the traction control position and the shut-off position. Alternatively, the solenoid-operated power-source selecting device may consist of two separate solenoid-operated shut-off valves. One of the two shut-off valves is provided in a fluid passage which connects the master cylinder and the pressure regulating device, while the other shut-off valve is provided in a fluid passage which connects the traction control power source and the pressure regulating device. In this case, the normal position is established when the above-indicated one shut-off valve is open while the other shut-off valve is closed. The traction control position is established when the above-indicated other shut-off valve is open while the above-indicated one shut-off valve is closed. Further, the shut-off position is established when both of the two shut-off valves are closed.

In a yet further form of the present invention, the traction control means further comprises a normally-closed shut-off valve which is opened at a predetermined time for releasing the pressurized fluid from the accumulator to the reservoir. This feature is effective to avoid possible troubles which may arise from permeation of a pre-charging gas from a gas chamber into an accumulator chamber of the accumulator of the traction control means. The instant arrangement eliminates the presence of the pre-charging gas in the accumulator chamber, since the gas is discharged from the accumulator when the pressurized fluid is discharged from the accumulator at a predetermined time.

BRIEF DESCRIPTION OF THE DRAWINGS

The above and optional objects, features and advantages of the present invention will become apparent by reading the following detailed description of presently preferred embodiments of the invention, when considered in connection with the accompanying drawings, in which:

FIGS. 4, 5, 6 and 7 are flow charts showing control programs stored in a read-only memory of the traction control unit of FIG. 2;

FIGS. 8a–8c are time charts schematically showing anti-lock control and traction control operations performed in the braking system of FIG. 1;

DETAILED DESCRIPTION OF THE PREFERRED EMBODIMENTS

Figure 1:
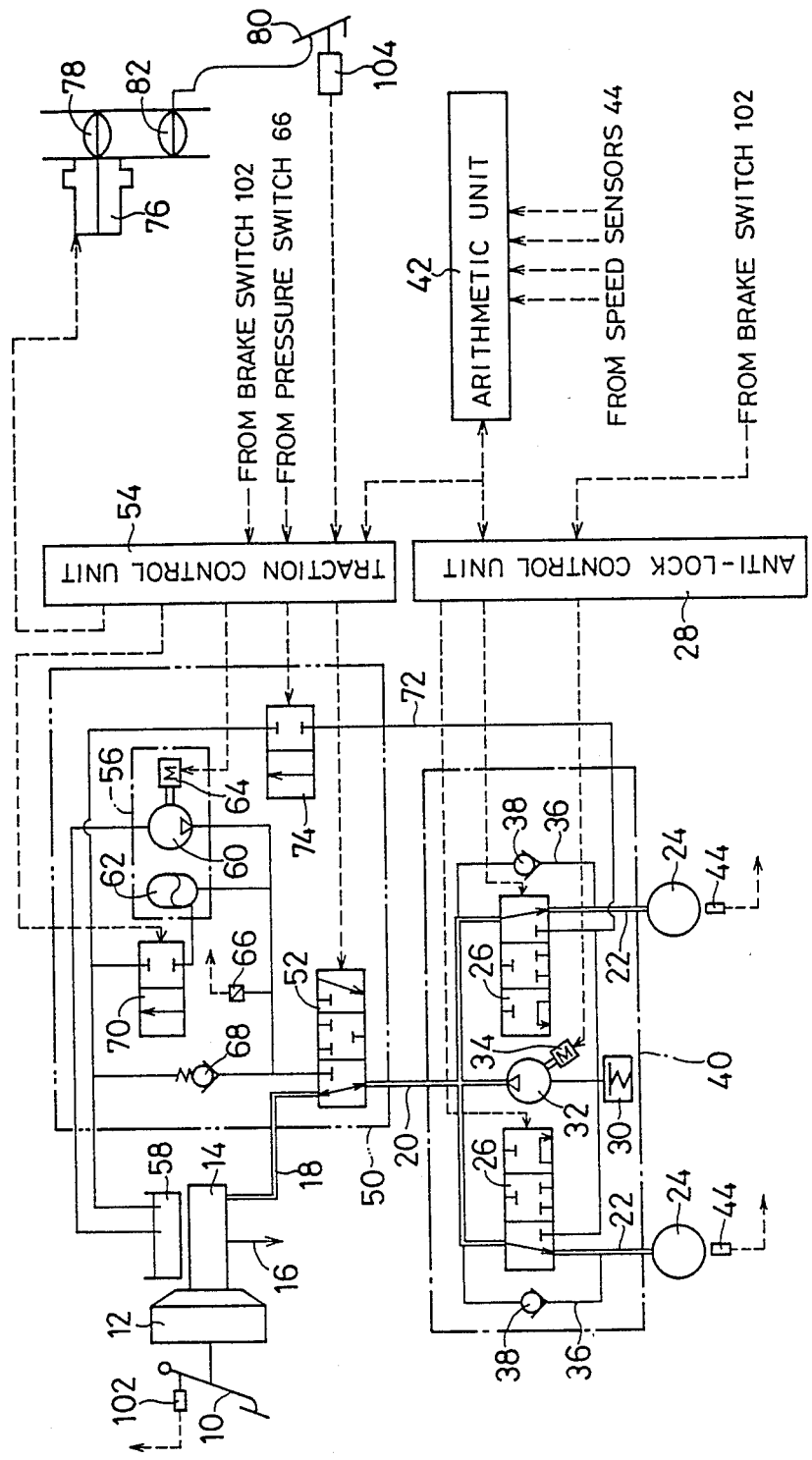
FIG. 1 is a schematic diagram of one embodiment of a hydraulically operated anti-lock braking system of the present invention.

Referring first to FIG. 1, there is shown a hydraulically operated anti-lock braking system for a rear-drive motor vehicle which is driven by rear wheels. In the figure, reference numeral 10 designates a brake operating member in the form of a brake pedal. The brake pedal 10 is operatively connected to a master cylinder 14 via a booster 12. The master cylinder 14 has two mutually independent pressure chambers disposed in tandem. A fluid pressure produced in one of the two pressure chambers is supplied through a fluid passage 16 to front wheel cylinders for applying brake to front wheels of the vehicle. Since the brake application to the front wheels is not directly associated with the principle of the present invention, no detailed illustration and description thereof are provided herein.

A fluid pressure produced in the other pressure chamber of the master cylinder 14 is supplied through fluid passages 18, 20, 22 to rear wheel cylinders 24 for applying brake to rear drive wheels of the vehicle. The fluid passage 20 is connected to two solenoid-operated three-position directional control valves 26, 26, respectively, which serve as a solenoid-operated pressure regulating device. The two directional control valves 26, 26 are connected by the respective fluid passages 22, 22 to the two rear wheel cylinders 24, 24. The solenoid-operated pressure regulating device may be constituted by other types of valve arrangements. For example, a pair of two-position valves connected in series may be used in place of each three-position directional control valve 26.

Each solenoid-operated three-position directional control valve 26 is controlled by an anti-lock control unit 28 constituted principally of a computer, so that the valve 26 is placed selectively in one of three positions: a PRESSURE INCREASE position; a PRESSURE DECREASE position; and a PRESSURE HOLD position. In the PRESSURE INCREASE position, the appropriate rear wheel cylinder 24 communicates with the master cylinder 14. In the PRESSURE DECREASE position, the rear wheel cylinder 24 communicates with a reservoir 30 of the system. In the PRESSURE HOLD position, the rear wheel cylinder 24 is disconnected from both of the master cylinder 14 and the reservoir 30. While the directional control valves 26 are placed in the PRESSURE DECREASE position, the fluid is discharged from the rear wheel cylinders 24 to the reservoir 30. The fluid in the reservoir 30 is pumped up by a pump 32 and is returned into the fluid passage 20. The pump 32 is driven by a motor 34, which is operated by the anti-lock control unit 28. The fluid passage 20 and the fluid passages 22 are connected also by by-pass passages 36, 36 which by-pass the three-position directional control valves 26, 26, in parallel relation with the valves. In each of these b-pass passages 36, there is provided a check valve 38 which permits a flow of the fluid from the passage 22 toward the passage 20 and inhibits a fluid flow in the reverse direction. The three-position directional control valves 26, 26, reservoir 30, pump 32, motor 34, by-pass passages 36, 36 and check valves 38, 38 are incorporated in a first module in the form of an anti-lock control actuator 40. The anti-lock control unit 28 is connected to an arithmetic unit 42 constituted principally of a computer. The arithmetic unit 42 is adapted to perform arithmetic operations to calculate various parameters, such as rotating speeds of the front left and right wheels and rear left and right drive wheels, an acceleration rate of the vehicle, and a slip ratio of the wheels, based on signals produced by four speed sensors 44 provided for the four wheels. The calculated parameter data is fed from the arithmetic unit 42 to the anti-lock control unit 28. It 10 will be understood that the arithmetic unit 42 and the speed sensors 44 cooperate to provide detecting means for detecting the slip ratio of the rear drive wheels 24. It will be further understood that the anti-lock control unit 28, the modular anti-lock control actuator 40, and the slip ratio detecting means 42, 44 constitute anti-lock control means for controlling the fluid pressure in the rear wheel cylinders 24, so as to maintain the slip ratio of the rear wheels in an optimum range.

Between the fluid passage 18 and the fluid passage 20, there is provided a traction control actuator 50 which includes a solenoid-operated three-position directional control valve 52. This directional control valve 52 serves as a power-source selecting device as described below, and is controlled by a traction control unit 54 which is constituted principally by a computer separate from the computer of the anti-lock control unit 28. The directional control valve 52 has three positions: a NORMAL position; a TRACTION CONTROL position; and a SHUT-OFF position. The valve 52 is placed selectively in these three positions under the control of the traction control unit 54. In the NORMAL position, the master cylinder 14 communicates with the anti-lock control three-position directional control valves 26, 26. In the TRACTION CONTROL position, a traction control power source 56 of the traction control actuator 50 communicates with the directional control valves 26, 26. In the SHUT-OFF position, the master cylinder 14 and the traction control power source 56 are both disconnected from the directional control valves 26, 26. The traction control power source 56 includes a pump 60 for pumping up a brake fluid from a reservoir 58, which feeds the master cylinder 14 with the brake fluid. The power source 56 further includes an accumulator 62 for storing the pressurized fluid delivered from the pump 60. A motor 64 for driving the pump 60 is controlled by the traction control unit 54, in response to a signal generated by a pressure switch 66 which senses the fluid pressure in a passage connected to the accumulator 62, so that the pressure in the accumulator 62 is maintained in a predetermined range. Reference numeral 68 denotes a pressure relief valve provided to prevent an excessive rise of the pressure in the accumulator 62 due to inadequate control of the pump motor 64 by the traction control unit 54.

Between the accumulator 62 and the reservoir 58, there is provided a solenoid-operated shut-off valve 70 which is normally open. This shut-off valve 70 is opened so that the entire volume of the brake fluid stored in the accumulator 62 is discharged into the reservoir 58, each time the braking system is electrically turned on. In this connection, it is noted that the accumulator 62 is pre-charged with a suitable high-pressure gas such as a high-pressure nitrogen gas, which tends to permeate through a sealing member between a gas chamber and an accumulator chamber. Accordingly, there is a tendency that the high-pressure charging gas is dissolved in the brake fluid stored in the accumulator chamber, whereby the maximum volume of the fluid that can be stored in the accumulator 62 is gradually reduced if the charging gas in the accumulator 62 is not discharged together with the brake fluid. In order to avoid this reduction in the capacity of the accumulator 62 due to the presence of the charging gas in the accumulator chamber, it is desirable to discharge the brake fluid once stored in the accumulator 62, and load the accumulator with a new volume of the fluid, at a suitable frequency.

A drain passage 72 is provided to connect discharge ports of the anti-lock control three-position directional control valves 26, 26 to the reservoir 58. In this drain passage 72, there is provided a solenoid-operated shut-off valve 74. While this shut-off valve 74 is normally closed, it is opened at the same time the three-position directional control valve 52 is set to its TRACTION CONTROL position to perform a traction control operation. With the shut-off valve 74 held open, the brake fluid which is discharged from the rear wheel cylinders 24 through the directional control valves 26 during the traction control operation is returned to the reservoir 58. The solenoid-operated three-position directional control valve 52 and the solenoid-operated shut-off valve 74 cooperate to constitute a communication switching device. This valve device, traction control power source 56, pressure switch 66, relief valve 68, and solenoid-operated shut-off valve 70 constitute a major portion of the traction control actuator 50. Like the anti-lock control actuator module 40, this traction control actuator 50 is also constructed as a module so that the traction control actuator module 50 may be readily added to the anti-lock control actuator module 40, together with the traction control unit 54. Namely, the anti-lock braking system may be easily provided with the traction control function, by simply adding the traction control module 50 with the traction control unit 54. Thus, two types of braking systems (one having only an anti-lock control function, and the other having both the anti-lock control function and the traction control function) may be readily available, depending upon whether the traction control actuator module 50 and the traction control unit 54 are provided, or not.

The traction control unit 54 has a function of controlling a second throttle valve 78 through a stepping motor 76, in order to adjust an output of an engine of the vehicle which is determined by a first throttle valve 82 operated by an accelerator pedal 80. Since this aspect of the traction control operation is well known in the art and is not essential to the understanding of the present invention, no further description thereof is deemed necessary.

Figure 2:
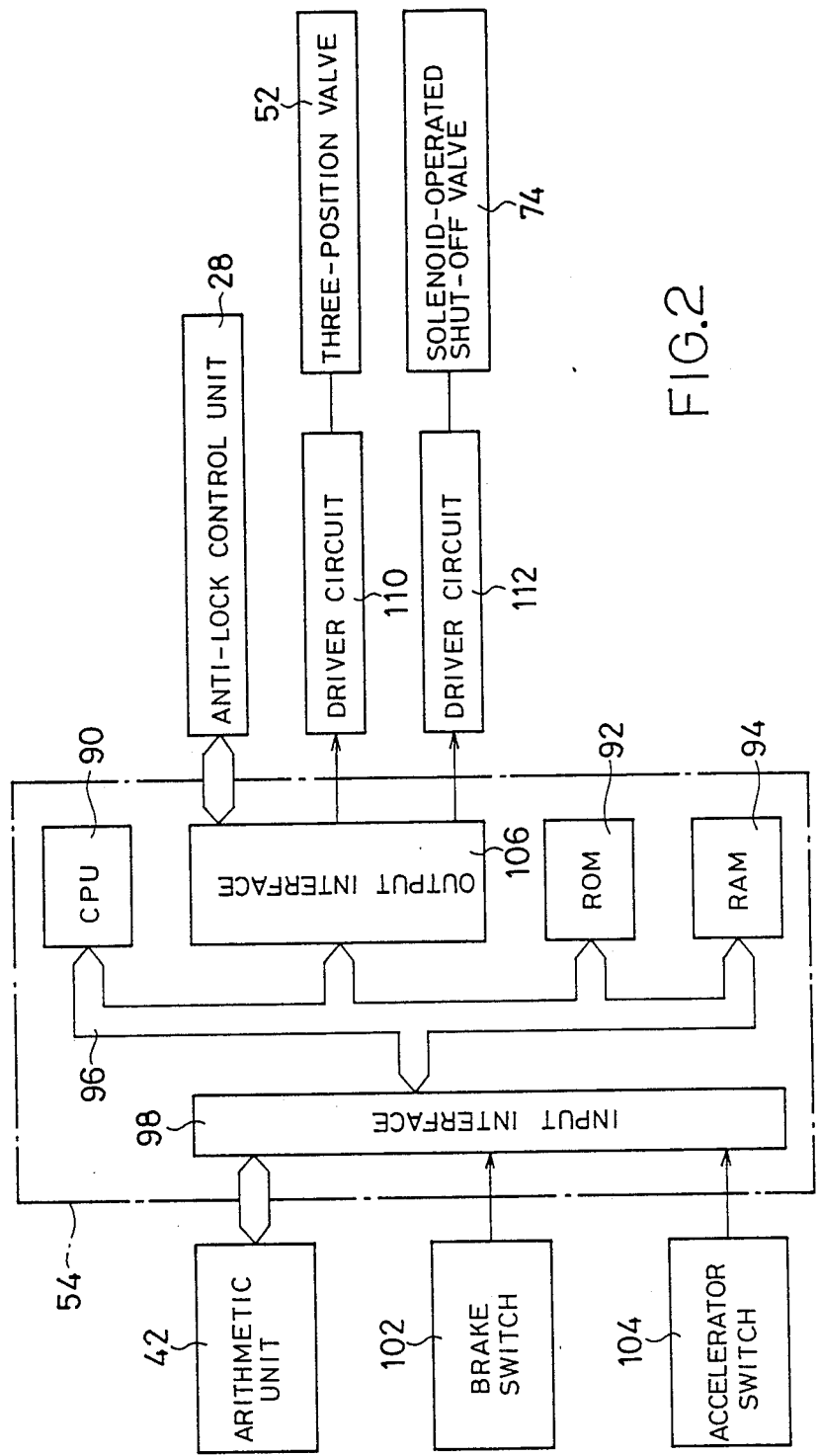
FIG. 2 is a block diagram showing a traction control unit for effecting a traction control operation which includes a traction control termination routine.
Figure 3:
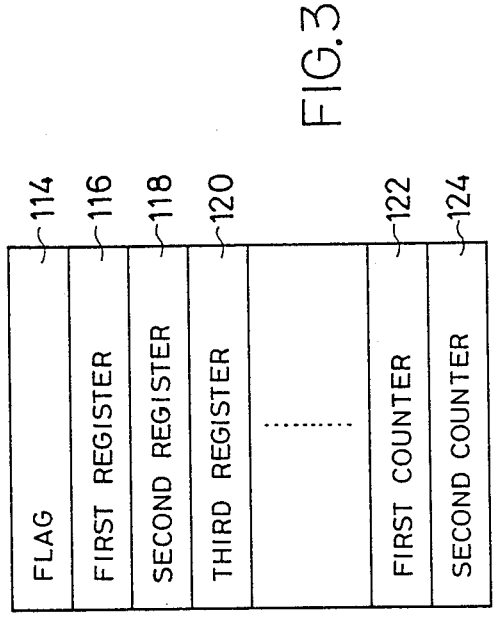
FIG. 3 is a view illustrating registers and counters of a random-access memory of the traction control unit of FIG. 2, which are associated with the principle of the present invention.

Referring next to FIG. 2, the traction control unit 54 includes a central processing unit (CPU) 90, a read-only memory (ROM) 92, a random-access memory (RAM) 94, and a bus 96 which interconnects these and other elements of the unit. To the bus 96 is connected an input interface 98, which in turn is connected to the above-indicated arithmetic unit 42, a brake switch 102 for detecting an operating amount of the brake pedal 10, and an accelerator switch 104 for detecting an operating amount of the accelerator pedal 80. The bus 96 is also connected to an output interface 106, to which is connected the above-indicated anti-lock control unit 28 so that the solenoid-operated three-position directional control valves 26, 26 are controlled by the control unit 28. Further, the output interface 106 is connected to the solenoid-operated three-position directional control valve 52 through a driver circuit 110, and the solenoid-operated shut-off valve 74 through a driver circuit 112. The motor 64, solenoid-operated shut-off valve 70, stepping motor 76 and other electrically operated elements are also connected to the output interface 106 through appropriate driver circuits, though these elements are not shown in FIG. 2. The RAM 94 has a flag 114, a first register 116, a second register 118, a third register 120, a first counter 122 and a second counter 124, as indicated in FIG. 3. The ROM 92 stores a program for a main routine of FIG. 4 which includes a traction control routine of FIG. 5 and a traction control termination routine of FIG. 6, and further stores a program for an interruption routine of FIG. 7. The interruption routine is executed at a time interval which is shorter than a cycle time of the main routine, for example, at a time interval of 1 ms where the cycle time of the main routine is 5 ms. In the interruption routine, various commands or data stored in the registers of the RAM 94 during execution of the main routine are retrieved and fed to the driver circuits 110, 112 through the output interface 106, whereby the three-position valve 52 and the shut-off valve 74 are controlled.

There will be described an operation of the instant anti-lock braking system, by reference to FIG. 8.

When the vehicle is running in a normal manner, the three-position valves 26, 52 and the shut-off valves 70, 74 are placed in the positions of FIG. 1. Accordingly, the master cylinder 14 is in communication with the rear wheel cylinders 24, while the traction control power source 56 is disconnected from the rear wheel cylinders 24.

Upon depression of the brake pedal 10, the fluid pressure in the rear wheel cylinders 24 is raised as indicated at (e) in FIG. 8. As a result, the rotating speeds of the rear wheels are lowered, and speed signals indicative of the lowered rear wheel speeds are fed from the speed sensors 44 to the arithmetic unit 42. The arithmetic unit 42 calculates the rotating speeds, acceleration rates and slip ratios of the rear wheels, running speed of the vehicle, based on the speed signals from the speed sensors 44. In the meantime, the anti-lock control unit 28 starts operating in response to the signal from the brake switch 102, which is indicative of an operating amount of the brake pedal 10. When the slip ratio of one of the rear drive wheels exceeds a predetermined upper limit, an anti-lock control routine (not shown) is executed, wherein the three-position directional control valves 26 is set to their PRESSURE DECREASE position, as indicated at (d) in FIG. 8. Consequently, the brake fluid is discharged from the rear wheel cylinders 24 to the reservoir 30, whereby the pressures in the rear wheel cylinders 24 are lowered as indicated at (e) in FIG. 8. When the rotating speeds of the rear wheels are raised as a result of the pressure reduction in the rear wheel cylinders 24, the anti-lock control unit 28 operates to set the three-position valves 26 to their PRESSURE HOLD or PRESSURE INCREASE position, in order to maintain the slip ratios of the rear wheels in the optimum range. Thus, the braking pressures in the rear wheel cylinders 24 are controlled in a well known anti-lock fashion. At the moment when the three-position valves 26 are set to the PRESSURE DECREASE position as described above, the pump 32 is turned on as indicated at (c) in FIG. 8, so that the brake fluid discharged from the rear wheel cylinders 24 to the reservoir 30 is returned to the master cylinder 14 through the fluid passages 20 and 18.

When the depression of the brake pedal 10 is released, this fact is detected by the brake switch 102. In response to the signal from the brake switch 102, the anti-lock control unit 28 terminates the anti-lock control routine. Namely, the three-position valves 26 are switched to the PRESSURE INCREASE position, and the pump 32 is turned off. At the same time, the release of the brake pedal causes the fluid pressure in the master cylinder 14 to be lowered, whereby the brake fluid is rapidly returned from the rear wheel cylinders 24 back to the master cylinder 14 via the by-pass passages 36. Thus, the braking system is placed in the non-operated state.

When the accelerator pedal 80 is depressed to accelerate the vehicle, the operating amount of the pedal 80 is detected by the accelerator switch 104. In response to the signal from the switch 104, the traction control unit 54 starts to operate. If the slip ratio of one of the two rear wheels which is calculated by the arithmetic unit 42 exceeds the predetermined upper limit, a traction control operation is initiated. Described more specifically, the three-position direction control valve 52 is switched to the TRACTION CONTROL position, while at the same time the solenoid-operated shut-off valve 74 is opened, as indicated at (a) and (b) in FIG. 8. With the directional control valve 52 placed in the TRACTION CONTROL position, the pressurized brake fluid is supplied from the accumulator 62 to the appropriate rear wheel cylinder 24, through the corresponding three-position directional control valve 26, whereby brake is applied to the rear wheel in question. Concurrently, the traction control unit 54 operates to regulate the braking pressure in the relevant rear wheel cylinder 24, through the anti-lock control unit 28. That is, the fluid pressure in the relevant cylinder 24 is controlled through the switching operations of the appropriate directional control valve 26, so that the slip ratio of the relevant rear wheel is held within the optimum range. When the slip ratio of the wheel falls below the predetermined upper limit or the vehicle running speeds exceeds a predetermined upper limit, the traction control unit 54 terminates the traction control operation, lowering the fluid pressure in the relevant rear wheel cylinder 24, whereby the brake is released from the rear wheel cylinder 24.

While the directional control valve 52 is placed in the TRACTION CONTROL position for effecting the traction control operation, as described above, the valve 52 is not continuously kept in the TRACTION CONTROL position. More precisely, the valve 52 is momentarily placed in the SHUT-OFF position, for a short time duration which follows a time duration of T1 in which the vale 52 is held in the TRACTION CONTROL position. Suppose the sum of the two time durations (SHUT-OFF time plus TRACTION CONTROL time T1) is T2, the directional control valve 52 is switched between the TRACTION CONTROL and SHUT-OFF positions, at the cycle time of T2. This switching operation of the valve 52 is implemented for a diagnostic purpose, namely, to check if the traction control unit 54 whose principal part is constituted by a computer is defective or not. If the traction control unit 54 is defective, the valve 52 is kept in the TRACTION CONTROL position, contrary to the switching operation of the valve 52 between the TRACTION CONTROL and SHUT-OFF positions according to the instant embodiment. Therefore, it is possible to detect a failure or defective condition of the traction control unit 54, and take necessary steps such as turning off the unit and informing the vehicle operator of the presence of such a failure or defective condition.

Figure 9:
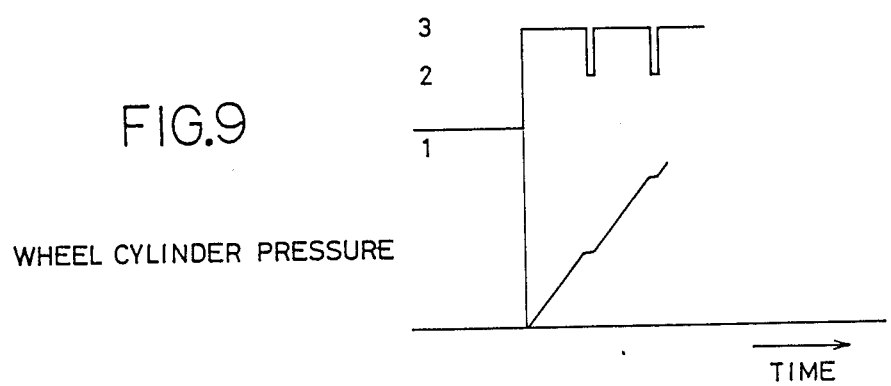
FIGS. 9 and 10 are views explaining a significance of utilizing a three-position directional control valve as a power-source selecting valve device.
Figure 10:
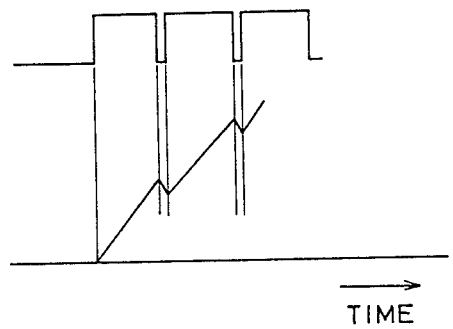

The three-position directional control valve 52 may be replaced by a two-position directional control valve. In this case, however, it is impossible to perform a traction control operation as indicated at (a) in FIG. 8, wherein the valve 52 is switched between the TRACTION CONTROL and SHUT-OFF positions. Hence, it is impossible to diagnose the traction control unit 54 for a defective condition. In the directional control valve 52 operated as indicated at (a) in FIG. 8 according to the present embodiment, the fluid pressure in the rear wheel cylinder 24 is increased, with relatively short time periods for which the fluid pressure is held constant, as indicated in FIG. 9. However, these pressure hold periods will not give a significant adverse effect on the traction control operation. If a two-position directional control valve used in place of the three-position valve 52 is momentarily placed in the NORMAL position during the traction control operation as indicated in FIG. 10, the traction control unit 54 may be monitored for a defective condition. In this case, however, the fluid pressure in the rear wheel cylinder 24 is lowered at a given time interval while the fluid pressure is increased, as also indicated in FIG. 10. Since the intermittent pressure drops gives a significant adverse effect on the traction control operation, the use of a two-position directional control valve is not practically possible.

When the traction control operation is terminated, the fluid pressure in the rear wheel cylinder 24 is lowered. This pressure lowering operation is effected according to a traction control termination routine. Upon termination of the traction control operation, the three-position directional control valve 52 is switched to the SHUT-OFF position, and the shut-off valve 74 is held in the open position. At the same time, the three-position directional control valve 26 is switched to the PRESSURE DECREASE position, through the anti-lock control unit 28. The valve 26 is held in the PRESSURE DECREASE position for a time period T3 after the termination of the traction control operation. As a result, the fluid pressure in the rear wheel cylinder 24 is discharged to the reservoir 58 through the valve 26, drain passage 72 and shut-off valve 74, whereby the fluid pressure in the cylinder 24 is lowered as indicated at (e) in FIG. 8. After the time period T3 has lapsed, the valve 26 is switched to the PRESSURE INCREASE position while the valve 52 remains in the SHUT-OFF position for a time period T4. Therefore, the fluid pressure in the fluid passage 20 between the three-position valves 52, 26 is released, and then the valve 52 is switched to the NORMAL position. After a time period T5 has lapsed, the shut-off valve 74 is restored to the closed position.

It follows from the above description that after the completion of the traction control operation, fluid return control is effected such that the fluid in the rear wheel cylinder 24 is released to the reservoir 58 through the drain passage 72, and pressure release control is effected such that the relatively high pressure trapped in the fluid passage 20 is released, before the master cylinder 14 is brought into communication with the rear wheel cylinder 24. If the above sequence of events is not performed prior to the switching of the valve 52 to the NORMAL position, the relatively high pressure is abruptly applied to the master cylinder 14, which causes vibrations and noises of the braking system.

The traction control routine and the traction control termination routine which have been discussed are implemented by execution of the programs shown in the flow charts of FIGS. 4–7.

Figure 4:
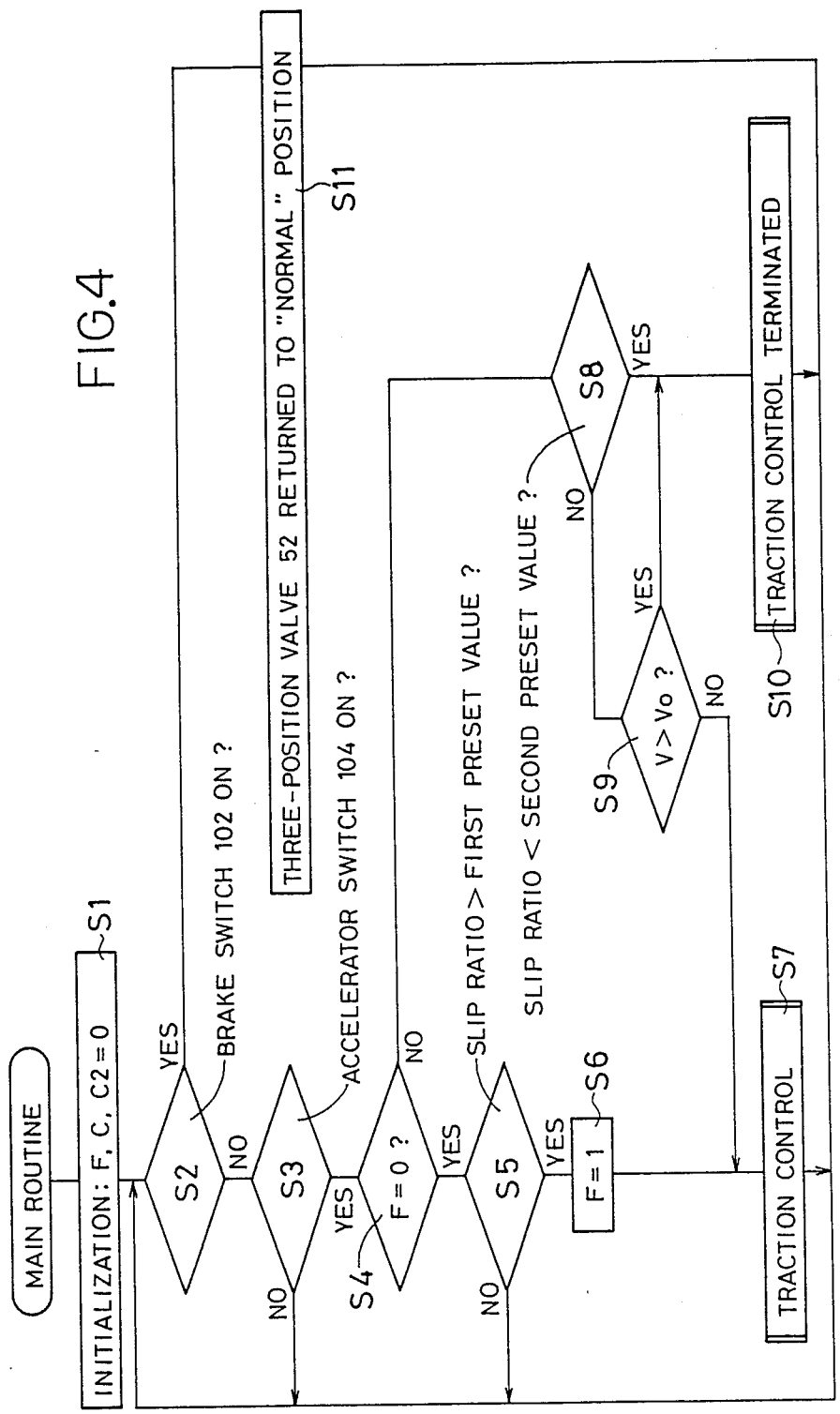

Referring to FIG. 4, initializing step S1 is executed upon power application to the braking system. In this step S1, the flag 114, first and second registers 116, 18 and the first and second counters 122, 124 are reset. Further, the shut-off valve 70 is opened in step S1. After the entire volume of the brake fluid stored in the accumulator 62 is drained, the shut-off valve 70 is closed. Thereafter, step S2 and the subsequent steps are repeatedly executed at a cycle time of 5ms. Described more specifically, steps S2 and S3 are executed to check if the brake switch 102 and the accelerator switch 104 are on. If neither the brake pedal 10 nor the accelerator pedal 80 has been depressed, negative decisions (NO) are obtained in steps S2 and S3, and these steps are repeatedly executed. If the accelerator pedal 80 has been depressed with the brake pedal 10 placed in the non-operated position, an affirmative decision (YES) is obtained in step S3, and step S4 is implemented to check if the flag 114 is in the reset state. When step S4 is executed for the first time, an affirmative decision is obtained in step S4, and the control flow goes to step S5 to check if the last slip ratio of each rear wheel calculated by the arithmetic unit 42 is greater than a first preset value.

The slip ratio greater than the first preset value is a condition for initiating a traction control operation. That is, step S5 is followed by steps S6 and S7 if an affirmative decision (YES) is obtained in step S5. The flag 114 is set in step S6, and the traction control routine is performed in step S7 for the first time. If a negative decision (NO) is obtained in step S5, the control flow goes to step S2. When step S4 is executed for the second time after steps S6 and S7 are executed, a negative decision is obtained in step S4 since the flag 114 has been set in step S6. As a result, step S4 is followed by step S8 wherein the traction control unit 54 determines whether the calculated slip ratio of the rear wheel is smaller than the second preset value, which is smaller than the first preset value. If the calculated slip ratio is larger than the second preset value, step S8 is followed by step S9 to determine whether the vehicle running speed V is greater than a preset speed Vo. If the decisions in steps S8 and S9 are both negative, the traction control routine is again executed in step S7. Thus, after the second execution of step S2, steps S3, S4, S8 and S9 are executed before the traction control routine of step S7 is executed. If the vehicle speed V exceeds the preset value Vo during execution of the traction control routine, an affirmative decision is obtained in step S9, and the traction control termination routine is executed in step S10. If the slip ratio falls below the second present value, an affirmative decision is obtained in step S8, and the control flow goes to step S10 to implement the traction control termination routine. It will be understood that the traction control termination routine of step S10 is implemented after execution of steps S2-4 and S8 (and step S9 if appropriate).

Where the brake switch 102 is turned on during execution of the traction control routine or traction control termination routine, an affirmative decision (YES) is obtained in step S2, and the three-position directional control valve 52 is immediately restored to the NORMAL position.

Figure 5:
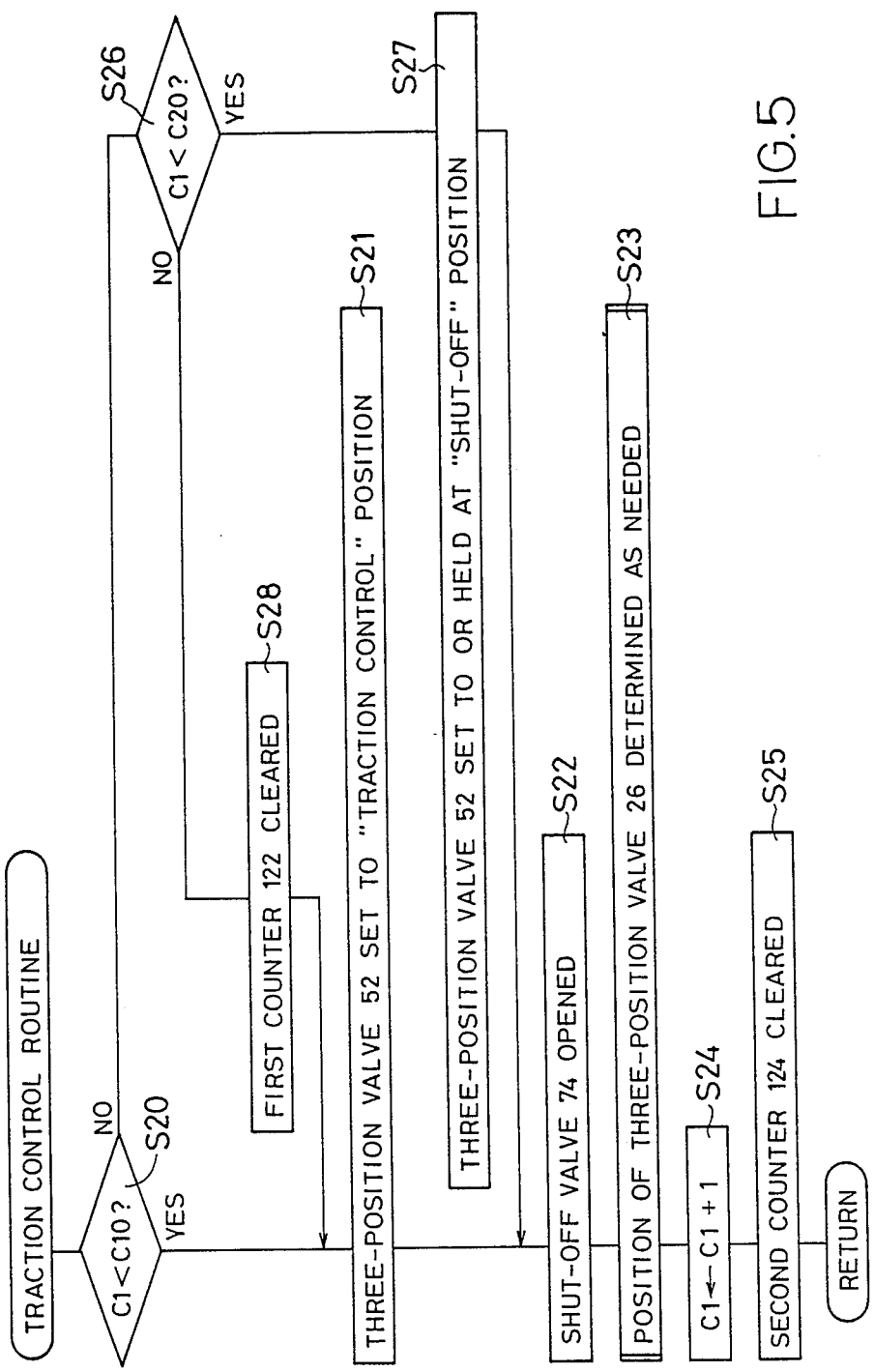

Referring next to the flow chart of FIG. 5, there will be described the traction control routine.

Initially, step S20 is executed to determine whether the count C1 of the first counter 122 is smaller than a preset value C10 which is equal to a quotient obtained by dividing the time period T1 by the cycle time 5 ms of the main routine. Since the first counter 122 has been reset upon initialization in step S1 of the main routine of FIG. 4, an affirmative decision (YES) is obtained when step S20 is executed for the first time. Step S20 is therefore followed by step S21 wherein a command to switch the valve 52 to the TRACTION CONTROL position is stored in the first register 116. Then, the control flow goes to step S22 wherein a command to open the shut-off valve 74 is stored in the second register 118. These commands stored in the first and second registers 116, 118 are executed at a time interval of 1ms in the interruption routine of FIG. 7, whereby the valve 52 and the shut-off valve 74 are switched to the TRACTION CONTROL position and the open position, respectively, through the appropriate driver circuits 110, 112.

Then, in step S23, a command selecting one of the three positions of the valve 26 so as to maintain the slip ratio of the relevant rear wheel in the optimum range is determined, and the command is executed by the anti-lock control unit 28. Since this aspect of operation is well known in the art and is not essential to the understanding of the present invention, no detailed description thereof is deemed necessary. In the traction control operation, the pump 32 is not activated, and therefore the brake fluid discharged from the rear wheel cylinders 24 to the reservoir 30 is returned to the reservoir 58 via the drain passage 72 and shut-off valve 74. Accordingly, the operating noise of the pump 32 is avoided. Step S23 is followed by step S24 wherein the count C1 of the first counter 122 is incremented, and by step S25 wherein the second counter 124 is cleared. The control flow then goes back to the main routine.

When the count C1 becomes greater than the value C10 during repeated execution of the traction control routine, that is, when the time period T1 has elapsed, a negative decision (NO) is made in step S20, and the control flow goes to step S26 to determine whether the count C1 is smaller than a value C20 which is equal to a quotient obtained by dividing the time period T2 by the cycle time of 5ms of the main routine. If a negative decision is obtained in step S26, namely, if the count C1 is greater than the value C10 but is smaller than the value C20, step S27 is executed to store in the first register 116 a command for switching the valve 52 to the SHUT-OFF position. As a result, the valve 52 is switched to or held in the SHUT-OFF position, in the same manner as described above with respect to step S21. Subsequently, steps S22-S25 are implemented, and the control flow goes back to the main routine. When the count C1 becomes greater than the value C20, namely, when the time period T2 has elapsed, a negative decision is made in step S26, and step S28 is performed to clear the first counter 122. Then steps S21-S25 are executed. More specifically, the valve 52 is switched from the SHUT-OFF position to the TRACTION CONTROL position. When the traction control routine is executed in the next control cycle, steps S20 and S21-25 are implemented in the same manner as in the first control cycle.

Figure 6:
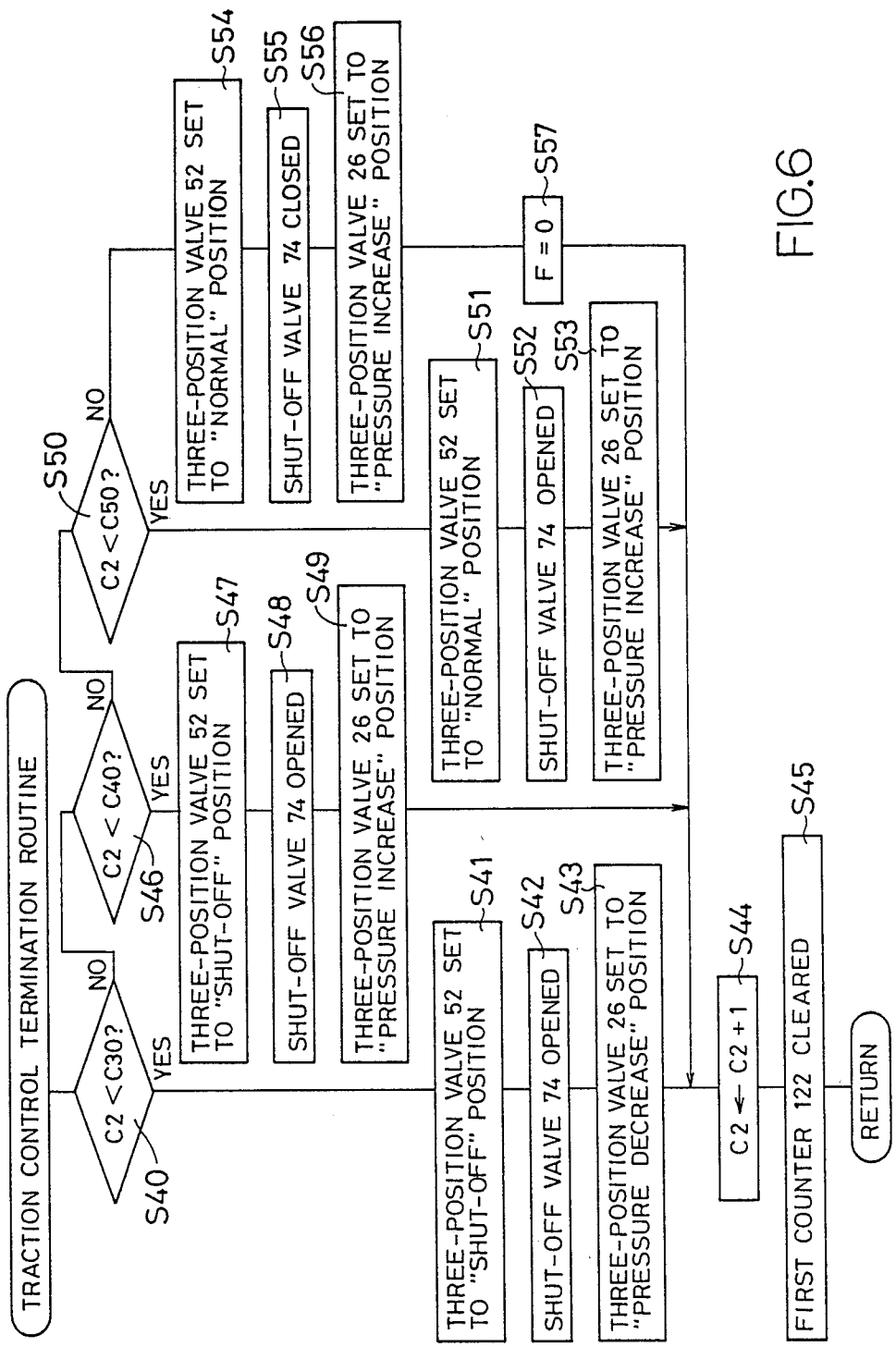

There will next be described the traction control termination routine, referring to the flow chart of FIG. 6.

Initially, step S40 is executed to determine whether the count C2 of the second counter 124 is smaller than a preset value C30 which is equal to a quotient obtained by dividing the time period T3 by the cycle time of 5 ms of the main routine. Since an affirmative decision (YES) is obtained in step S40 when this step is executed for the first time, step S41 is implemented wherein a command for switching the valve 52 to the SHUT-OFF position is stored in the first register 116. In the next step S42, a command for opening the shut-off valve 74 is stored in the second register 118. Accordingly, the valve 52 is switched to or held in the SHUT-OFF position through the driver circuit 110, while the shut-off valve 74 is opened or held open through the driver circuit 112. Subsequently, the control flow goes to step S43 wherein a command for switching the valve 26 to the PRESSURE DECREASE position is stored in the third register 120. This command is executed by the anti-lock control unit 28. By execution of these steps S41, S42 and S43, the fluid pressures in the rear wheel cylinders 24 are lowered. Successively, the count C2 of the second counter 124 is incremented in step S44, and the first counter 122 is cleared. The control flow then goes back to the main routine.

When a negative decision (NO) is obtained in step S40 due to elapse of the time period T3 during repeated execution of steps S40-S45, the control flow goes to step S46 to determine whether the count C2 is smaller than a preset value C40 which is equal to a quotient obtained by dividing the time period T4 by the main routine cycle time 5 ms. When an affirmative decision is made in step S46, that is, when the count 2 is larger than the value C30 but is smaller than the value C40, an affirmative decision is made in step S46, and this step S46 is followed by step S47 wherein a command for switching the valve 52 to the SHUT-OFF position is stored in the first register 116. In the next step S48, a command for opening the shut-off valve 4 is stored in the second register 118. In the next step S49, a command for switching the valve 52 to the PRESSURE INCREASE position is stored in the third register 120. As a result of execution of these steps S47-S49, the relatively high fluid pressure trapped in the fluid passage 20 is released. The control flow then goes to steps S44 and S45, and then goes back to the main routine.

When a negative decision (NO) is obtained in step S46, the control flow goes to step S50 to determine whether the count C2 is smaller than a preset value C50 which is equal to a quotient obtained by dividing the time period T5 by the main routine cycle time 5 ms. Where the count C2 is greater than the value C40 but is smaller than the value C50, an affirmative decision is made in step S50, and the control flow goes to step S51 in which a command for switching the valve 52 to the NORMAL position is stored in the first register 116, whereby the valve 52 is restored to the NORMAL position. Successively, steps S52 and S53 are implemented. In these steps, the same commands as described with respect to steps S48 and S49 are stored in the second and third registers 118, 120, so that the shut-off valve 74 is opened, and the valve 26 is held in the PRESSURE INCREASE position.

When the count C2 becomes greater than the value C50, that is, when the time period T5 has elapsed, a negative decision (NO) is obtained in step S50, and steps S54 and S56 are executed to store in the first and third registers 116, 120 the same commands as described with respect to steps S51 and S53. In step S55, a command for closing the shut-off valve 74 is stored in the second register 118. In other words, the shut-off valve 74 is kept open until the time period T5 has elapsed. Up until this time, the brake fluid is permitted to be returned to the reservoir 58 through the drain passage 72. After execution of steps S54, 55 and 56, the flag 114 is reset in step S57, and the control flow goes back to the main routine via steps S44, S45. In step S57, the flat 114 is reset, and in step S45 the first counter 120 is cleared, whereby the traction control unit 54 is restored to its initial or original state.

In the case where the brake switch 102 is turned on during a traction control operation in the main routine of FIG. 4, the three-position directional control valve 52 is immediately returned to the NORMAL position, without the traction control termination routine being executed. In such event, however, the traction control termination routine may be executed.

Figure 11:
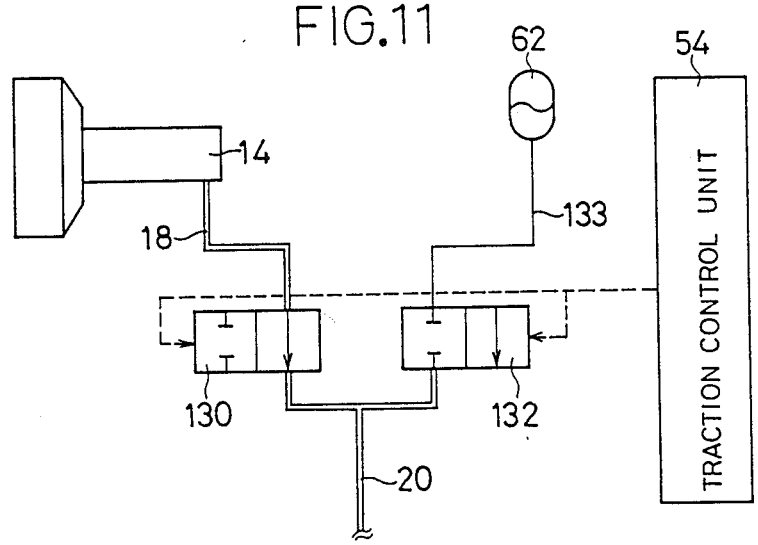
FIG. 11 is a fragmentary view showing another embodiment of the braking system of the invention which uses two shut-off valves as the power-source selecting valve device.

The three-position directional control valve 52 may be replaced by a pair of shut-off valves 130, 132, as shown in FIG. 11, the valve 130 being provided between the passages 18 and 20 while the valve 132 being provided between a passage 133 connected to the accumulator 62 and the passage 20. In this case, the shut-off valves 130 and 132 are switched to the closed and open positions, respectively, in step S21 of the flow chart of FIG. 5, and the shut-off valves 130, 132 are both closed in steps S41 and S47 of FIG. 5. Further, the shut-off valves 130 and 132 are switched to the open and closed positions, respectively, in steps S51 and S54 of FIG. 5. This modified arrangement permits the same switching operations as performed by the single three-position directional control valve 52. If the traction control unit 54 is adapted to monitor a manner in which the shut-off valve 132 is switched from the open position (equivalent to the TRACTION CONTROL position of the valve 52) to the closed position (equivalent to the SHUT-OFF position of the valve 52), it is possible to diagnose the traction control unit 54 for any malfunction or defective condition.

While the present invention has been described in its presently preferred embodiments, it is to be understood that the invention is not limited to the precise details of the illustrated embodiments, but may be embodied with various changes, variations, modifications and improvements which may occur to those skilled in the art, without departing from the spirit and scope of the invention defined in the following claims.

What is claimed is:

1. An anti-lock braking system with a traction control function for a vehicle, comprising:
   a hydraulically operated brake device including a master cylinder which produces a braking pressure in response to an operation of a brake operating member, and a wheel cylinder activated by the produced braking pressure to apply brake to a drive wheel of the vehicle;
   an anti-lock control means including slip ratio detecting means for detecting a slip ratio of said drive wheel and a pressure regulating device for controlling a fluid pressure in said wheel cylinder, so as to maintain said slip ratio below a predetermined upper limit;
   traction control means including a traction control power source which has a pump and an accumulator, and further including a communication switching device comprising first means for providing selective fluid communication of said pressure regulating device with said traction control power source or said master cylinder;
   said communication switching device further comprising second means for maintaining a discharge port of said pressure regulating device in communication with a reservoir whenever said traction control power source is held in communication with said pressure regulating device and for disconnecting said discharge port from said reservoir while said master cylinder is held in communication with said pressure regulating device.

2. An anti-lock braking system according to claim 1, wherein said anti-lock control means includes an anti-lock control actuator constructed as a first module which incorporates at least an anti-lock control hydraulic pressure source, and said pressure regulating device, and said traction control device includes a traction control actuator constructed as a second module separate from said first module, said second module incorporating at least said traction control power source and said communication switching device.

3. An anti-lock braking system according to claim 2, wherein said anti-lock control means further includes an anti-lock control unit for controlling said anti-lock control actuator, and said traction control device further includes a traction control unit for controlling said traction control actuator, said anti-lock control unit and said traction control unit being constituted by respective separate computers.

4. An anti-lock braking system according to claim 1, further comprising fluid return control means operable upon termination of a traction control operation by said traction control means, for bringing said wheel cylinder into communication with said reservoir through said pressure regulating device to thereby lower the fluid pressure in said wheel cylinder, and subsequently placing said first means of the communication switching device in a position in which said master cylinder communicates with said pressure regulating device.

5. An anti-lock braking system according to claim 1, further comprising pressure release control means operable upon termination of a traction control operation by said traction control means, for releasing a fluid pressure in a passage between said pressure regulating device and said first means of the communication switching device, into said wheel cylinder through said pressure regulating device, and subsequently restoring said first means of the communication switching device to a position in which said master cylinder communicates with said pressure regulating device.

6. An anti-lock brake system according to claim 1, wherein said first means of the communication switching device includes a solenoid-operated power-source selecting device for said selective fluid communication of said pressure regulating device with said traction control power source or said master cylinder, and said second means of the communication switching device comprises a solenoid-operated shut-off valve for providing fluid communication between said discharge portion of said pressure regulating device and said reservoir.

7. An anti-lock braking system according to claim 6, wherein said solenoid-operated power-source selecting device has a normal position in which said master cylinder communicates with said pressure regulating device, a traction control position in which said traction control power source communicates with said pressure regulating device, and a shut-off position in which said master cylinder and said traction control power source are both disconnected from said pressure regulating device, said braking system further comprising diagnostic control means operable during a traction control operation by said traction control means, for placing said solenoid-operated power-source selecting device alternately in said traction control position and said shut-off position for respective predetermined time durations.

8. An anti-lock braking system according to claim 7, wherein said solenoid-operated power-source selecting device consists of a single three-position directional control valve which has said normal position, said traction control position and said shut-off position.

9. An anti-lock braking system according to claim 6, wherein said solenoid-operated power-source selecting device consists of two separate solenoid-operated shut-off valves, one of said two shut-off valves being provided in a fluid passage which connects said master cylinder and said pressure regulating device, the other of said two shut-off valves being provided in a fluid passage which connects said traction control power source and said pressure regulating device.

10. An anti-lock braking system according to claim 1, wherein said traction control means further comprises a normally-closed shut-off valve which is opened at a predetermined time for releasing said pressurized fluid from said accumulator to said reservoir.

* * * * *